W. C. STARKEY.
RAIL BOND.
APPLICATION FILED SEPT. 21, 1917.

1,336,932.

Patented Apr. 13, 1920.

2 SHEETS—SHEET 1.

Witness:
R. L. Farrington

Inventor,
Wm. C. Starkey.
By Brown & Nunn
Attys.

W. C. STARKEY.
RAIL BOND.
APPLICATION FILED SEPT. 21, 1917.
1,336,932.
Patented Apr. 13, 1920.
2 SHEETS—SHEET 2.
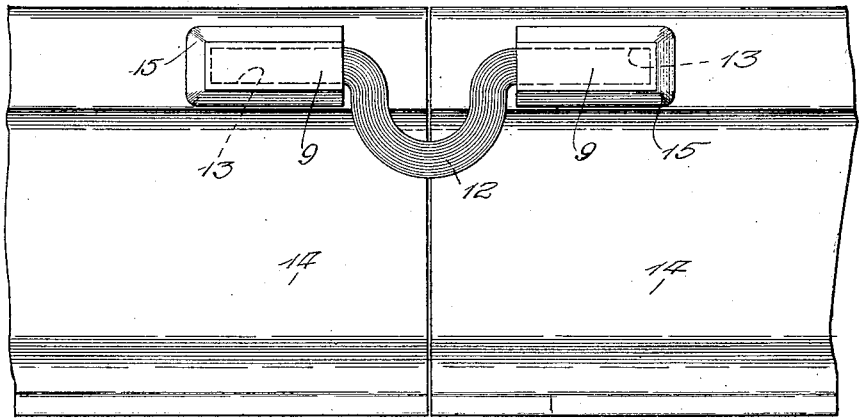
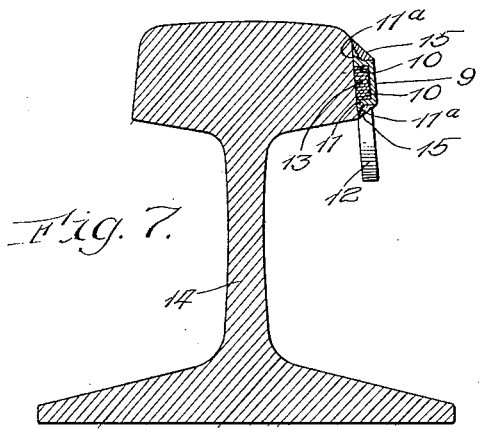
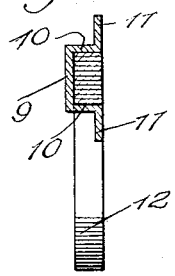
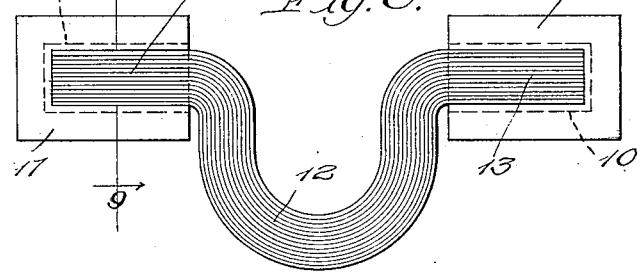
Witness:
R. L. Farrington
Inventor,
Wm. C. Starkey.
By Brown & Nissen
Attys.

UNITED STATES PATENT OFFICE.

WILLIAM CARLETON STARKEY, OF MANSFIELD, OHIO, ASSIGNOR TO THE OHIO BRASS COMPANY, OF MANSFIELD, OHIO, A CORPORATION OF NEW JERSEY.

RAIL-BOND.

1,336,932. Specification of Letters Patent. Patented Apr. 13, 1920.

Original application filed June 26, 1916, Serial No. 105,943. Divided and this application filed September 21, 1917. Serial No. 192,456.

*To all whom it may concern:*

Be it known that I, WILLIAM C. STARKEY, a citizen of the United States, residing at Mansfield, in the county of Richland and State of Ohio, have invented certain new and useful Improvements in Rail-Bonds, of which the following is a specification.

This invention relates to rail bonds and among the objects of my invention are to construct a bond which is applied to a rail by an intense heating flame, such as oxy-acetylene, and at the same time to protect the flexible portion of the bond from the heat; to produce a bond in which the time of contact of the flame with the copper of the bond body is reduced as low as possible; and to produce a bond which is made an integral part of the rail by welding or brazing the bond in place, thereby producing a joint which is highly efficient both electrically and mechanically. Other objects of the invention will appear hereinafter.

The invention consists in the novel construction, combination and arrangement of the parts and the method and manner of assembling them and applying them to the rail. This is a division of my application for rail bonds and method of applying them, Serial No. 105,943, filed June 26, 1916.

Figure 1:
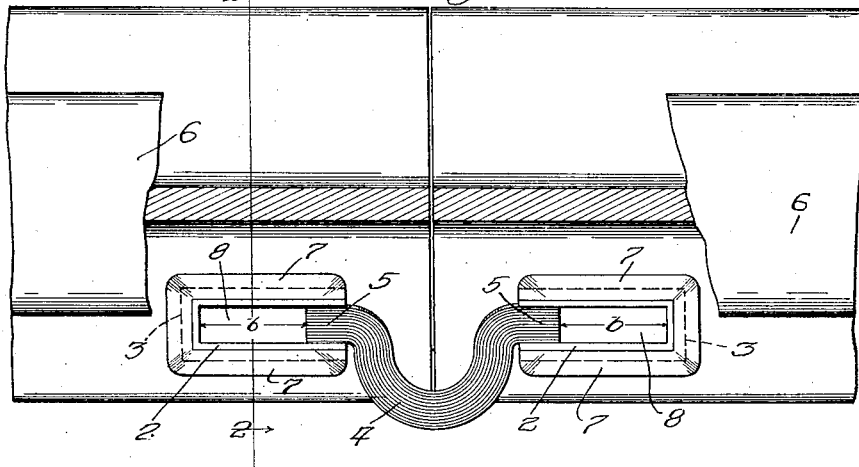
Figure 2:
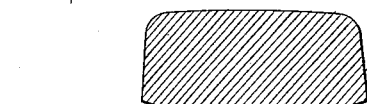
Figure 3:
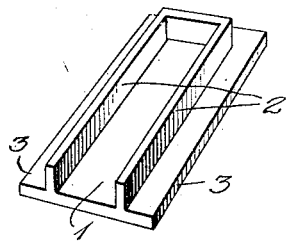
Figure 4:
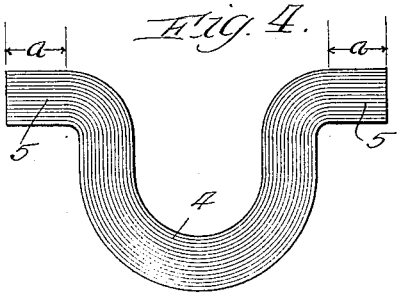
Figure 5:

In the accompanying drawings: Figure 1 is a plan view of a bond constructed in accordance with the principles of the invention applied to the flanges of two adjacent rails, portions of the heads of the rails being omitted for clearness; Fig. 2 is a sectional view taken on the line 2—2 of Fig. 1; Fig. 3 is a perspective of a metal casing forming a portion of the bond terminal; Fig. 4 is a side elevation of the bond body; Fig. 5 is an end view of the body shown in Fig. 4; Fig. 6 is a side elevation of a bond applied to the heads of two adjacent rails using a modified form of terminal casing; Fig. 7 is a sectional view of the same; Fig. 8 is a side elevation of the bottom of the bond shown in Fig. 6; and Fig. 9 is a section taken on the line 9—9 of Fig. 8.

In applying bonds under a high temperature heating flame, such as the electric arc, oxy-acetylene, and the like, where the temperature reaches 6000 degrees F. to 6300 degrees F., it has been found that this high temperature, if applied to copper for any considerable length of time, will oxidize and otherwise destroy the good qualities of forged copper as a strong and efficient electrical conductor, but that this flame can be applied to iron or steel to better advantage without destroying the properties of the iron or steel so quickly. With this in view the various parts of the invention have been so constructed and arranged as to avoid the detrimental effect of the flame directly on the copper in the terminal of the rail bond in applying the bond to the rail.

In order to carry out this invention a casing of iron or steel open on one face and one end, as shown in Fig. 3, is provided, consisting of a bottom plate 1, with an upright rim 2, and a projecting flange 3. A bond body 4 comprises a plurality of layers or strands of copper to form a flexible member, and the ends 5 are welded into a solid homogeneous mass for a distance from the end indicated by the letter *a*. The cross section of this welded end 5 is of the same or slightly less dimensions as the end opening of the casing.

To apply this bond one of the casings shown by Fig. 3 is placed in proper position adjacent the end of each rail 6, preferably on the flange of the rail, although any flat surface is satisfactory. A heating flame is then applied to the angle formed by the upstanding rim 2, the flange 3 of the casing and the adjacent surface of the rail 6, and when the proper temperature has been reached this angular portion is filled in with a welding or attaching metal 7 which is melted by the flame and unites both with the surface of the rail and with the casing. The flame is applied by means of a blow pipe in a manner well known in this art, and the welding or attaching metal is usually applied by means of a thin rod or wire which melts and fills in the space at the desired point upon the application of the heated flame thereto. In this operation it may happen that the flange 3 of the casing is melted down at its edge forming an irregular surface, as indicated by the reference numeral 3ª in Fig. 2, but the casing is then firmly attached or welded to the rail and the attaching metal 7 covers the rim 3 so that the melted down condition is neither visible nor objectionable.

With the casing attached in this manner to the rail one welded end 5 of the bond body 4 is placed in the open end of the casing where it substantially fits in cross section leaving a space $b$ as shown in Fig. 1, in the casing which must be filled with attaching metal 8 the same as when applying the attaching metal 7 to the outside of the casing. The frame is applied to the bond end when the casing is filled with the attaching metal 8 which immediately melts and unites both with the bond end 5 and the inside face of the rim 2 of the casing thereby making an efficient electrical and mechanical union between the bond body, the casing and the rail. The attaching metal used is preferably an alloy having a lower melting point than the material of the bond body, such as bronze, which has both high electrical conductivity and is strong mechanically. It will be obvious from the above description that by placing the bond body in position after securely attaching the casing to the rail, the body itself will be subjected to heat for a short time only and hence a minimum injury will result to the bond body, if any at all. Also, the attaching metal being strong and of high electrical conductivity and having a welded union with the rail and the bond end, the device as a whole constitutes a highly efficient electrical joint. A modification of this construction so made as to be applied in a different position but still preserving all the points and substance of the invention, is shown in Figs. 6 to 9. This casing 9 is made of iron or steel having one face and one end open with a projecting rim 10 and a flange 11 extending from the outer edge of the rim. A bond 12 consists of a plurality of copper strips or members to give flexibility of which the ends 13 are welded into solid homogeneous masses of a size to fit the entire interior of the casing 9. These welded ends 13 are then inserted in the casing 9 first heating the parts a little less than the melting point of the copper and subjecting them to a heavy pressure which unites the casing and the bond end securely so that the finished bond with both ends fastened thereto is as shown in Fig. 8.

This bond is then held at the ends of a pair of rails 14 by any suitable clamping device or other means. As shown in Figs. 6 and 7 the bond is applied to the heads of the rails. A heating flame is applied to the angle formed by the rim 10, flange 11 and the adjacent face of the rail until the surfaces are brought to a temperature equal or approaching the melting point. Welding or attaching metal 15 in the form of a small rod or wire is then applied to the heated parts which melts and flows or alloys with the parts heated, forming an integral union of the parts and filling the angle with the metal 15, as clearly shown in Fig. 7. The flange 11 of this casing may be melted and reduced in section to a certain extent at different points around the edge, but this is of no disadvantage as it is found that sufficient flange remains to unite with the attaching metal thus anchoring the terminal fixedly in place. That part of the casing in contact with the copper body does not melt as readily as the flange 11 because of the high heat conducting property of the copper which carries away or distributes the heat.

In constructing the bond shown by Figs. 6 to 9, it may not be necessary to weld the ends of the bond body 12 into a homogeneous mass before placing them in the casing 9 and the ends of the bond strips or members may be simply placed in the casing and then brought to a welding heat; by compression the layers or members of the bond may then be united into a solid mass and also united with the casing and then applied to the rail as described.

It is obvious that other constructions and methods of uniting and applying may be adopted without departing from the spirit of the invention.

With this construction it is obvious that the amount of metal, and particularly the amount of copper contained in a bond, is reduced to a minimum. It is customary to provide bonds of this class with copper terminals which are of considerably greater cross section than the bond itself and are therefore very heavy and expensive. By providing a metal casing of steel or iron not only is a highly efficient bond produced, but the amount of copper in the bond is greatly reduced and the wastage is reduced to a minimum.

I claim:—

1. A rail bond comprising a metallic conducting body portion, and a casing of dissimilar metal for each end of the body portion, the casing comprising a rim which fits over the end of the body portion, and a flange extending from the rim by which it is attached to the rail and attaching metal applied to the face of said rim opposite said conducting body portion and to said flange and said rail for attaching said bond to said rail.

2. A rail bond comprising a plurality of flexible members compacted together at the ends and forming a conductor, a metal casing having a rim for fitting over the compact ends, a flanged portion on said casing for attaching the casing to a rail, and attaching metal applied to the side of said rim opposite said conductor and to said rail and bridging said flange for attaching said casing to said rail.

3. In a rail bond, the combination with a plurality of flexible members forming a conductor and having extremities which are pressed tightly together, a casing of metal having a higher melting point than the said members and comprising a rim into which the ends of said members are fitted, a flange which extends from the rim forming a portion for attachment to a rail, and attaching metal applied to the face of said rim opposite said conductor and to said flange and said rail.

4. A rail bond consisting of a plurality of strips of copper forming a conductor, a ferrous casing with an upstanding rim into which the ends of the members are inserted, and with an extending flange for attaching the casing to a rail, and attaching metal applied to said rim on the face thereof opposite said conductor and to said flange and rail.

5. In a rail bond, a flexible body member, a casing for each end of said member consisting of metal having a higher melting point than the body member with an upstanding rim into which the end of the body member is inserted, and a projecting flange for attaching the casing to a rail, said casing being secured to said rail by an attaching metal applied to the face of said rim opposite said body member and to said flange and rail.

6. In a rail bond, a terminal casing having a rim and a projecting flange, a flexible metal conductor of lower melting point than the casing having each end embraced by said rim, and an attaching metal of lower melting point than the conductor for attaching it to the casing and for attaching the casing to a rail, said attaching metal being applied to the face of said rim opposite said conductor and to said flange and rail.

7. The combination with a rail, of a rail bond therefor comprising a metallic casing having an upstanding rim, a conductor having a lower melting point than the casing and adapted to be inserted in the rim, and an attaching metal having a lower melting point than the conductor for attaching it to the casing and for attaching the casing to the rail, said attaching metal being applied to the face of said rim opposite said conductor and to said rail.

8. The combination with a rail, of a rail bond therefor comprising a metallic casing having an upstanding rim and a flange projecting from the rim, a flexible metallic conductor having a lower melting point than that of the casing and adapted to be inserted in the rim, and an attaching metal with a lower melting point than that of the conductor to fill the space between the conductor and the rim and to fill the angular space between the rim and the adjacent face of the rail covering the extending flange of the casing.

9. A rail bond consisting of a plurality of flexible copper strips, a terminal casing of ferrous material having a higher melting point than that of the copper and formed with a rim into which the extremities of the strips are inserted and with a flange extending from the rim, and an attaching metal having a lower melting point than the copper for attaching the ends of the strips in the rim of the casing and to fill in the angular spaces between the rim and the face of the rail to which the bond is applied, the attaching metal being fitted over the extending flange of the casing.

In testimony whereof I have signed my name to this specification on this 17th day of September, A. D. 1917.

WILLIAM CARLETON STARKEY.